United States Patent [19]

Rolf et al.

[11] Patent Number: 4,709,019
[45] Date of Patent: Nov. 24, 1987

[54] ANTHRAQUINONE-AZO PYRIDONE-CONTAINING COMPOUNDS

[75] Inventors: Meinhard Rolf; Rütger Neeff; Walter Müller, all of Leverkusen, Fed. Rep. of Germany

[73] Assignee: Bayer Aktiengesellschaft, Leverkusen, Fed. Rep. of Germany

[21] Appl. No.: 486,878

[22] Filed: Apr. 21, 1983

Related U.S. Application Data

[63] Continuation of Ser. No. 301,841, Sep. 14, 1981, which is a continuation of Ser. No. 167,559, Jul. 11, 1980, abandoned.

[30] Foreign Application Priority Data

Jul. 27, 1979 [DE] Fed. Rep. of Germany ....... 2930481

[51] Int. Cl.$^4$ .................... C09B 29/01; C09B 29/36; C09D 1/08; C09D 5/00
[52] U.S. Cl. .................................. 534/655; 534/575; 534/581; 534/887; 106/119; 106/288 Q; 106/300; 106/309
[58] Field of Search ....................... 260/156, 154, 155; 534/655

[56] References Cited

U.S. PATENT DOCUMENTS 3,640,674 2/1972 Berrie et al. .................. 260/156 X
3,657,214 4/1972 Berrie et al. .................. 260/156

FOREIGN PATENT DOCUMENTS 1932810 4/1969 Fed. Rep. of Germany .
1932808 4/1969 Fed. Rep. of Germany .
2216207 10/1972 Fed. Rep. of Germany ...... 260/156
2316845 10/1973 Fed. Rep. of Germany ...... 260/156
2014339 5/1970 France .
2224521 12/1972 France .
1256355 12/1971 United Kingdom ............... 260/156

Primary Examiner—Floyd D. Higel
Attorney, Agent, or Firm—Sprung Horn Kramer & Woods

[57] ABSTRACT

Anthraquinone-azo pyridone-containing compounds which in one of their tautomeric structures, correspond to the formula

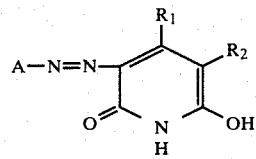

in which
A denotes an α-anthraquinone radical which is free from sulphonic acid groups and is unsubstituted or substituted and preferably consists of at most 5 fused rings;
$R_1$ denotes hydrogen; alkyl, preferably $C_1$–$C_4$-alkyl; aryl, preferably phenyl or naphthyl; carboxyl; carboxylic acid ester, preferably carboxylic acid $C_1$–$C_4$-alkyl ester; or hydroxyl and
$R_2$ denotes hydrogen; halogen; nitro; cyano; unsubstituted or substituted carbamoyl or sulphamoyl; alkylcarbonyl, in particular ($C_1$–$C_4$-alkyl)-carbonyl; alkoxycarbonyl, in particular ($C_1$–$C_4$-alkoxy)-carbonyl; alkyl- or unsubstituted or substituted aryl-sulphone, preferably $C_1$–$C_4$-alkyl-sulphone or unsubstituted or substituted phenylsulphone; or a hetero-aromatic radical, for example, a radical of the formula

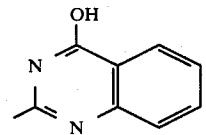

or of the formula

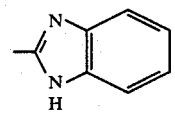

Such anthraquinone-azo compounds, because of their fastness to light and migration, are suitable for use in producing fast pigmented systems.

4 Claims, No Drawings

ANTHRAQUINONE-AZO PYRIDONE-CONTAINING COMPOUNDS

This application is a continuation of application Ser. No. 301,841, filed 9/14/81 which is a continuation of application Ser. No. 167,559, filed July 11, 1980 (now abandoned).

The invention relates to anthraquinone-azo compounds which, in one of their tautomeric structures, correspond to the formula

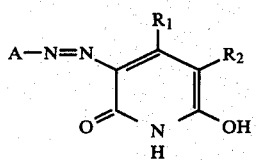

processes for their preparation and their use as pigments.

Other tautomeric forms of the compounds according to the invention correspond to the formulae

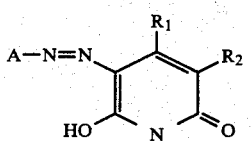

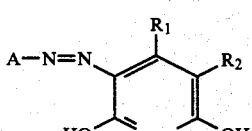

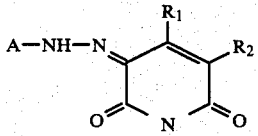

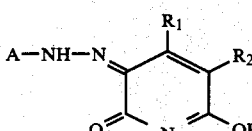

and

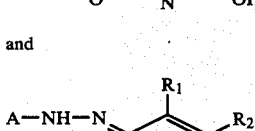

For simplicity, in the following text in each case only the tautomeric form shown in formula (I) is given. However, it should be emphasised that this does not mean a restriction of the invention with regard to a particular tautomer.

In the formula (I)

A denotes an α-anthraquinone radical which is free from sulphonic acid groups and is optionally further substituted and preferably consists of at most 5 fused rings, $R_1$ denotes hydrogen, alkyl, preferably $C_1$–$C_4$-alkyl, aryl, preferably phenyl or naphthyl, carboxyl, carboxylic acid ester, preferably carboxylic acid $C_1$–$C_4$-alkyl ester, or hydroxyl and $R_2$ denotes hydrogen, halogen, nitro, cyano, optionally substituted carbamoyl or sulphamoyl, alkylcarbonyl, in particular ($C_1$–$C_4$-alkyl)-carbonyl, alkoxycarbonyl, in particular ($C_1$–$C_4$-alkoxy)-carbonyl, alkyl- or optionally substituted aryl-sulphone, preferably $C_1$–$C_4$-alkylsulphone or optionally substituted phenylsulphone, or a hetero-aromatic radical, for example a radical of the formula

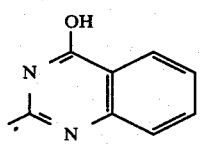

or of the formula

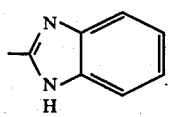

or of the formula

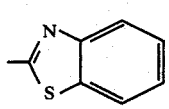

Preferred possible substituents of the carbamoyl and sulphamoyl groups are $C_1$–$C_4$-alkyl, and phenyl and benzyl, optionally substituted by $C_1$–$C_4$-alkyl, $C_1$–$C_4$-alkoxy, fluorine, chlorine, bromine, nitro or carboxamide.

Azo pigments obtained from pyridone coupling components have already been described in German Offenlegungsschrift No. 2,216,207. Surprisingly, it has now been found that the anthraquinone-azo pigments of the formula (I) have excellent fastness properties, in particular fastness to light and weathering, coupled with high tinctorial strength, and they thus represent an enrichment of the art.

To prepare the anthraquinone derivatives (I), aminoanthraquinones of the formula

A—NH$_2$                (V)

in which

A has the abovementioned meaning, are diazotised and the diazotisation products are reacted with coupling components of the formula

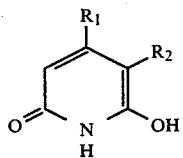 (VI)

in which $R_1$ and $R_2$ have the abovementioned meaning.

Suitable aminoanthraquinones of the formula (V) are, for example: 1-aminoanthraquinone, 1-amino-2-chloroanthraquinone, 1-amino-4-chloroanthraquinone, 1-amino-5-chloroanthraquinone, 1-amino-6-chloroanthraquinone, a mixture of 1-amino-6- and -7-chloroanthraquinone, 1-amino-5,8-dichloroanthraquinone, 1-amino-2-bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxylic acid amide, 1-aminoanthraquinone-2-carboxylic acid methyl ester, 1-amino-4-nitroanthraquinone-2-carboxylic acid, 1-amino-2-acetylanthraquinone, 1-amino-5-benzoylaminoanthraquinone, 1-amino-4-benzoylaminoanthraquinone, 1-amino-8-benzoylaminoanthraquinone, 1-amino-5-(2-chlorobenzoylamino)-anthraquinone, 1-amino-5-(3-chlorobenzoylamino)-anthraquinone, 1-amino-5-(4-chlorobenzoylamino)-anthraquinone, 1-amino-5-(2,5-dichlorobenzoylamino)-anthraquinone, 1-amino-5-(3-nitrobenzoylamino)-anthraquinone, 1-amino-4-(2-chlorobenzoylamino)-anthraquinone, 1-amino-4-(3-chlorobenzoylamino)-anthraquinone, 1-amino-4-(4-chlorobenzoylamino)-anthraquinone, 1-amino-4-(2,5-dichlorobenzoylamino)-anthraquinone, 1-amino-4-(3-nitrobenzoylamino)-anthraquinone, 1-amino-8-(2-chlorobenzoylamino)-anthraquionone, 1-amino-8(3-chlorobenzoylamino)-anthraquinone, 1-amino-8-(4-chlorobenzoylamino)-anthraquinone, 1-amino-8-(2,5-dichlorobenzoylamino)-anthraquinone, 1-amino-8-(3-nitrobenzoylamino)-anthraquinone, 1-amino-2-methyl-4-benzoylamino-anthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 3-methyl-6-amino-anthrapyridone, 3-methyl-7-amino-anthrapyridone, 4-amino-1,9-pyrazoleanthrone, 5-amino-1,9-pyrazoleanthrone, 4-amino-1,9-anthrapyrimidine, 5-amino-1,9-anthrapyrimidine and 5-amino-isothiazoleanthrone.

Preferred anthraquinone-azo compounds correspond to the formula

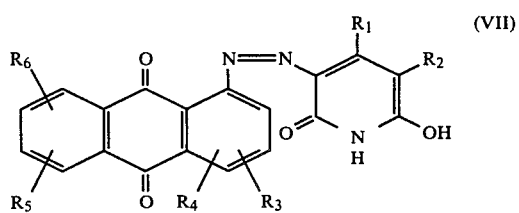 (VII)

wherein $R_1$ and $R_2$ have the abovementioned meaning, $R_3$ denotes hydrogen, halogen, such as fluorine, chlorine or bromine, nitro, $C_1$-$C_4$-alkyl, $C_1$-$C_4$-alkoxy, $C_1$-$C_4$-alkylamino, benzylamino, cyclohexylamino, $C_1$-$C_4$-alkyl-mercapto, phenylmercapto which is optionally substituted by $C_1$-$C_4$-alkyl, $C_1$-$C_4$-alkoxy, fluorine, chlorine, bromine or nitro, ($C_1$-$C_4$-alkoxy)-carbonyl, ($C_1$-$C_4$-alkoxy)-carbonyl, phenylamino which is optionally substituted by $C_1$-$C_4$-alkyl, $C_1$-$C_4$-alkoxy, chlorine or nitro, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine, nitro or carboxamido, carboxyl, hydroxyl, ($C_1$-$C_4$-alkyl)-carbonylamino, benzoylamino which is optionally substituted by $C_1$-$C_4$-alkyl, $C_1$-$C_4$-alkoxy, fluorine, chlorine, bromine or nitro, or benzenesulphonylamino which is optionally substituted by $C_1$-$C_4$-alkyl, $C_1$-$C_4$-alkoxy, fluorine, chlorine, bromine or nitro, $R_4$ denotes hydrogen, methyl, chlorine or hydroxyl, $R_5$ denotes hydrogen, halogen, such as fluorine, chlorine or bromine, nitro, $C_1$-$C_4$-alkyl, $C_1$-$C_4$-alkoxy, $C_1$-$C_4$-alkylamino, $C_1$-$C_4$-alkylmercapto, phenylmercapto which is optionally substituted by $C_1$-$C_4$-alkyl, $C_1$-$C_4$-alkoxy, fluorine, chlorine, bromine or nitro, ($C_1$-$C_4$-alkoxy)-carbonyl, ($C_1$-$C_4$-alkyl)-carbonyl, benzylamino, cyclohexylamino, phenylamino which is optionally substituted by $C_1$-$C_4$-alkyl, $C_1$-$C_4$-alkoxy, chlorine, bromine or nitro, carboxyl, hydroxyl, carbamoyl which is optionally monosubstituted or disubstituted by $C_1$-$C_4$-alkyl, benzyl or phenyl, it being possible for phenyl to be substituted by $C_1$-$C_4$-alkyl, $C_1$-$C_4$-alkoxy, fluorine, chlorine, bromine or nitro, ($C_1$-$C_4$-alkyl)-carbonylamino, benzoylamino which is optionally substituted by $C_1$-$C_4$-alkyl, $C_1$-$C_4$-alkoxy, fluorine, chlorine, bromine or nitro, $C_1$-$C_4$-alkanesulphonylamino, or benzenesulphonylamino which is optionally substituted by $C_1$-$C_4$-alkyl, $C_1$-$C_4$-alkoxy, fluorine, chlorine, bromine or nitro and $R_6$ denotes hydrogen, halogen, such as fluorine, chlorine or bromine, or hydroxyl.

Particularly preferred anthraquinone-azo compounds correspond to the formula

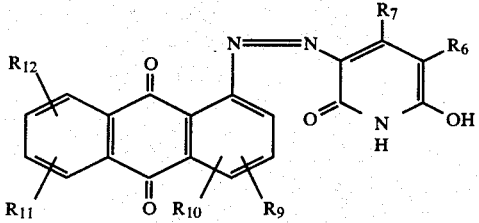

wherein

R₇ denotes hydrogen, methyl, carboxyl, carboxylic acid $C_1$–$C_4$-alkyl ester or hydroxyl, R₈ denotes hydrogen, cyano, carbamoyl which is optionally monosubstituted or disubstituted by $C_1$–$C_4$-alkyl, or chlorine, R₉ denotes hydrogen, methyl, chlorine, bromine, nitro, acetyl, $C_1$–$C_4$-alkoxycarbonyl, carbamoyl which is optionally substituted by $C_1$–$C_4$-alkyl or phenyl, it being possible for phenyl to be substituted by $C_1$–$C_4$-alkyl, $C_1$–$C_4$-alkoxy, chlorine, bromine or nitro, carboxyl, $C_1$–$C_4$-alkylcarbonylamino, or benzoylamino which is optionally substituted by $C_1$–$C_4$-alkyl, $C_1$–$C_4$-alkoxy, chlorine, bromine or nitro, R₁₀ denotes hydrogen, methyl or hydroxyl, R₁₁ denotes hydrogen, chlorine, bromine, nitro, hydroxyl, $C_1$14 $C_4$-alkylcarbonylamino, benzoylamino which is optionally substituted by $C_1$–$C_4$-alkyl, $C_1$–$C_4$-alkoxy, chlorine, bromine or nitro, carboxyl, $C_1$–$C_4$-alkoxycarbonyl, or carbamoyl which is optionally substituted by $C_1$–$C_4$-alkyl or phenyl, it being possible for phenyl to be further substituted by $C_1$–$C_4$-alkyl, $C_1$–$C_4$-alkoxy, chlorine, bromine or nitro, and R₁₂ denotes hydrogen, chlorine, hydroxyl or nitro.

Very particularly preferred anthraquinone-azo compounds correspond to the formula

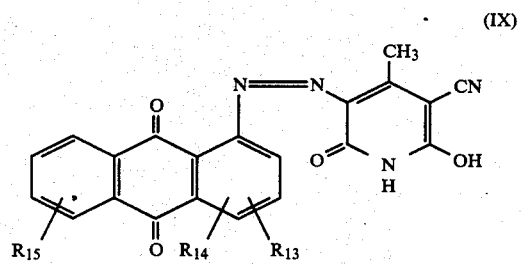

wherein

R₁₃ denotes hydrogen, hydroxyl, or benzoylamino which is optionally substituted by chlorine or nitro, R₁₄ denotes hydrogen or methyl and R₁₅ denotes hydrogen, chlorine, or benzoylamino which is optionally substituted by chlorine or nitro.

The anthraquinone-azo compounds of the formula (I) can be prepared by several processes.

1. The aminoanthraquinone of the formula $$A-NH_2 \quad (V)$$

is converted into the diazonium salt by known processes, for example with nitrosyl-sulphuric acid or by dropwise addition of a sulphuric acid solution of the aminoanthraquinone to an aqueous sodium nitrite solution, and the resulting suspension of the diazonium sulphate is coupled with a coupling component of the formula

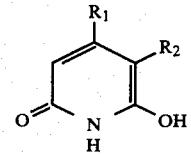

wherein

R₁ and R₂ have the abovementioned meaning, at 0°–90° C.

2. As a modification of this process, the diazonium salt obtained after the diazotisation can be isolated from the aqueous suspension by filtration and reacted, in water or in an organic solvent, after adding an inorganic or organic acid, with a coupling component of the formula (X) to give the azo pigment. For purification, the pigment is then optionally subjected to a heat treatment at 60°–200° C. in the same solvent or in another organic solvent. Organic solvents which are suitable for the coupling reaction are alcohols, such as methanol, ethanol or glycol monomethyl ether, aromatics, such as toluene, 1,2-dichlorobenzene, nitrobenzene or pyridine, and dipolar aprotic solvents, such as dimethylformamide, N-methylpyrrolidone, dimethylsulphoxide or sulpholane. Acids which are suitable for catalysing the coupling reaction are, for example, inorganic acids, such as sulphuric acid, phosphoric acid or hydrochloric acid, organic carboxylic acids, such as formic acid, acetic acid, chloroacetic acid, oxalic acid, maleic acid, 2,4-dichlorobenzoic acid or terephthalic acid, and organic sulphonic acids, such as ethanesulphonic acid, p-toluenesulphonic acid or naphthalene-2,6-disulphonic acid.

3. The aminoanthraquinone of the formula (V) is dissolved or suspended in an organic solvent and, after adding an inorganic or organic acid, is diazotised with an organic nitrite, such as methyl nitrite or amyl nitrite, or with sodium nitrite, which can be employed ir the form of an aqueous solution or as crystals. The diazotisation product is then coupled, without being isolated, to a coupling component of the formula (X). In this case also, it is expedient to follow the coupling reaction with a heat treatment of the resulting pigment.

The organic solvents and inorganic or organic acids suitable for this process are the same as those compounds listed for process 2.

4. The coupling components of the formula (X) are usually prepared in water. Another process for the preparation of the anthraquinone-azo compounds of the formula (I) consists in dispensing with the isolation and purification of the coupling component and reacting the aqueous suspension thereof directly with the diazonium salt of an aminoanthraquinone of the formula (V) to give the azo pigment. It is expedient to accelerate the coupling reaction by warming, preferably to 50°–100° C.

The coupling components of the formula (X) and their preparation are described in the literature. In most cases, they are synthesised by condensation of the amide (XI) with the β-ketoester (XII) under alkaline catalysis.

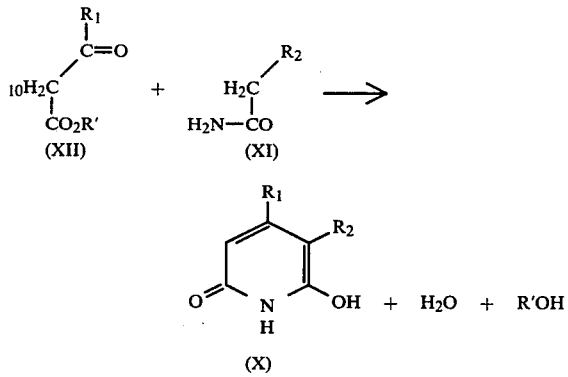

In the formulae (X), (XI) and (XII),
$R_1$ and $R_2$ have the abovementioned meaning.

A process for the preparation of the coupling component of the formula

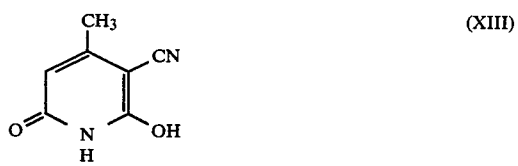

is described by I. Guareschi in Mem. Acad. Torino, cl. sci. fis., mat. e. nat. [2] 46, 11 (1895) (reprint) [C. 1896 I, 601; B. 29 Ref., 655 (1896)].

Further processes for the preparation of coupling components of the formula

are to be found in the following literature: German Offenlegungsschrift 2,719,079 ($R_1$=H; $R_2$=CN), Schulte und Mang, Arch. Pharmaz. 296, 501 (1963) ($R_1$=OH; $R_2$=$CONH_2$ or $CONHCH_3$), German Offenlegungsschrift No. 2,141,453 ($R_1$=$CH_3$; $R_2$=Cl), German Offenlegungsschrift No. 2,847,657 ($R_1$=H or alkyl; $R_2$=$SO_2$-alkyl) and German Offenlegungsschrift No. 2,705,562 ($R_1$=$CH_3$; $R_2$=$COCH_3$).

The compounds of the formula (I) are obtained in a form in which pigments can suitably be used, or they can be converted into a suitable form by after-treatment processes which are known per se, for example by dissolving or swelling in strong inorganic acids, such as sulphuric acid, and discharging the mixture onto ice. Fine division can also be achieved by grinding, with or without grinding auxiliaries, such as inorganic salts or sand, and if appropriate in the presence of solvents, such as toluene, xylene, dichlorobenzene or N-methylpyrrolidone. The tinctorial strength and transparency of the pigment can be influenced by varying the after-treatment.

Because of their fastness to light and migration, the compounds of the formula (I) are suitable for the most diverse applications of pigments. They can thus be used to produce very fast pigmented systems, such as mixtures with other substances, formulations, paints, printing pastes, coloured paper and coloured macromolecular substances. By mixtures with other substances, there may be understood, for example, mixtures with inorganic white pigments, such as titanium dioxide (rutile), or with cement. Examples of formulations are flush pastes with organic liquids or pastes and fine pastes with water, dispersing agents and, if appropriate, preservatives. The term paint means, for example, lacquers which dry physically or by oxidation, stoving lacquers, reactive lacquers, two-component lacquers, emulsion paints for weather-resistant coatings and distempers. By printing pastes there are to be understood those for printing paper, textiles and tin-plate. The macromolecular substances can be of natural origin, such as rubber, or they can be obtained by chemical modification, such as acetyl cellulose, cellulose butyrate or viscose, or be synthetically produced, such as polymers, polyaddition products and polycondensates. Examples which may be mentioned are plastic compositions, such as polyvinyl chloride, polyvinyl acetate, polyvinyl propionate, polyolefines, for example polyethylene, polyamides, high-molecular weight polyamides, polymers and copolymers of acrylates, methacrylates, acrylonitrile, acrylamide, butadiene and styrene, and polyurethanes and polycarbonates. The substances pigmented with the products claimed can be in any desired state.

The pigments of the formula (I) are also outstandingly fast to weathering, oil, acid, lime, alkali, solvents, overlacquering, overspraying and sublimation and outstandingly stable to heat and vulcanisation, and they have a high tinctorial strength and can easily be distributed in plastic compositions.

ADDITIONAL PRIOR ART

German Offenlegungsschrift No. 2,216,207 corresponding to British PS No. 1,360,635.

German Offenlegungsschrift No. 2,316,845 corresponding to British PS No. 1,455,632.

EXAMPLE 1

(a) 14 g of 1-aminoanthraquinone are dissolved in a mixture of 55 g of 96% strength sulphuric acid and 22 g of 40% strength nitrosylsulphuric acid in the cold and the solution is stirred at room temperature for 3 hours. It is then diluted with 200 g of water, and excess nitrite is destroyed with amidosulphonic acid. 9.5 g of 6-hydroxy-4-methyl-3-cyano-pyrid-2-one are then added, the temperature is increased to 90° C. in the course of 2 hours and the mixture is kept at this temperature until the diazonium salt can no longer be detected. After filtering off the product and washing it until neutral, 22.5 g (93% of theory) of the reddish-tinged yellow pigment of the formula

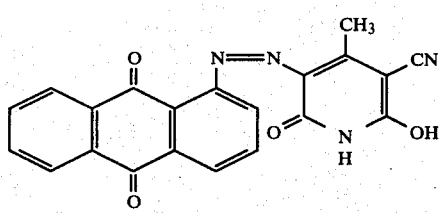

(XIV)

are obtained.

C$_{21}$H$_{12}$N$_4$O$_4$ (384.36) calculated: C, 65.6; H, 3.2; N, 14.6. Found: C, 65.9; H, 3.1; N, 14.6.

(b) 14 g of 1-aminoanthraquinone are dissolved in 70 g of 96% strength sulphuric acid in the cold and the solution is slowly added dropwise to a solution of 5 g of sodium nitrite in 250 g of ice-water. The mixture is subsequently stirred for 2 hours and the diazonium sulphate is filtered off and rinsed with a little ice-water. The precipitate is suspended in 200 ml of methanol, 20 ml of 85% strength formic acid and 9.5 g of 6-hydroxy-4-methyl-3-cyano-pyrid-2-one are added and the mixture is boiled under reflux for 3 hours. The product is filtered off hot and rinsed with methanol, and after drying, 21 g (87% of theory) of the yellow pigment described in Example 1a are obtained.

(c) 10 g of 96% strength sulphuric acid and 14 g of 1-aminoanthraquinone are dissolved in 300 ml of dimethylformamide at room temperature. A solution of 7.5 g of amyl nitrite in 20 ml of dimethylformamide is added dropwise, the mixture is subsequently stirred for 3 hours, 9.5 g of 5-hydroxy-4-methyl-3-cyano-pyrid-2-one are added and the mixture is stirred at room temperature for about 5 hours, until the diazonium salt can no longer be detected. The product is then filtered off and rinsed with dimethylformamide and methanol, and after drying, 22 g (91% of theory) of the yellow pigment given in Example 1a are obtained.

The yellow pigment given in Example 1a is obtained in similar yields and in the same quality if, in the process described in Example 1c, acetic acid or chloroacetic acid is used instead of sulphuric acid and toluene, 1,2-dichlorobenzene or nitrobenzene is used instead of dimethylformamide.

(d) 13 g of methyl cyanoacetate are added dropwise to 14.5 ml of concentrated ammonia and the mixture is stirred at 0° C. for 2 hours. 23 g of ethyl acetoacetate and 14.5 ml of concentrated ammonia are then added and the mixture is stirred at 80° C. for 4 hours, diluted with 400 ml of water and adjusted to pH 2 with sulphuric acid. The diazonium salt obtained from 28 g of 1-aminoanthraquinone is then introduced at about 80° C. and the mixture is stirred at this temperature until the diazonium salt can no longer be detected. The product is then filtered off hot, washed with water until the runnings are neutral, and dried. 21 g (87% of theory) of the yellow pigment given in Example 1a are obtained.

Azo pigments with the colour shades indicated in the following table are obtained by the processes described in Examples 1a–1d, using the aminoanthraquinones listed in the following table instead of 1-aminoanthraquinone.

TABLE 1

| Example | Aminoanthraquinone | Colour shade |
|---|---|---|
| 2 | 1-NH$_2$-8-NHCOC$_6$H$_5$-anthraquinone | Orange |
| 3 | 1-NH$_2$-4-NHCOC$_6$H$_5$-anthraquinone | Maroon |
| 4 | 1-NH$_2$-2-CH$_3$-4-NHCOC$_6$H$_5$-anthraquinone | Red-brown |
| 5 | 1-NH$_2$-4-NHCOC$_6$H$_4$Cl-anthraquinone | Brown |
| 6 | 1-NH$_2$-2-CH$_3$-anthraquinone | Reddish-tinged yellow |
| 7 | 1-NH$_2$-2-COOH-anthraquinone | Yellow |
| 8 | 1-NH$_2$-8-NHCOC$_6$H$_5$-anthraquinone | Red |
| 9 | 1-NH$_2$-4-NHC$_6$H$_5$-anthraquinone | Violet |

TABLE 1-continued

| Example | Aminoanthraquinone | Colour shade |
|---|---|---|
| 10 | 1-amino-4-(diazo) anthraquinone | Yellow |
| 11 | 1-amino-4-chloroanthraquinone | Yellow |
| 12 | 1-amino-2-(ethoxycarbonyl)anthraquinone (COOC₂H₅) | Orange |
| 13 | 1-amino-2-(N-methylcarbamoyl)anthraquinone (CONHCH₃) | Orange |
| 14 | 1-amino-2-(2,5-dichlorophenylcarbamoyl)anthraquinone | Orange |
| 15 | 1-amino-4-acetamidoanthraquinone (NHCOCH₃) | Maroon |
| 16 | 1-amino-5-hydroxyanthraquinone (OH) | Yellow |
| 17 | 1-amino-chloroanthraquinone | Yellow |
| 18 | 1-amino-5-(2,3,5,6-tetrachlorobenzamido)anthraquinone | Reddish-tinged yellow |
| 19 | 1-amino-6-(2,3-dichlorophenylcarbamoyl)anthraquinone | Yellow |
| 20 | 1-amino-4-nitroanthraquinone (NO₂) | Yellow |

Azo pigments with the colour shades indicated in the following table are obtained by the processes described in Examples 1a–1c, using the pyridones and aminoanthraquinones listed in the following table instead of 6-hydroxy-4-methyl-3-cyano-pyrid-2-one and 1-aminoanthraquinone.

TABLE 2

| Example | Pyrid-2-one | Aminoanthraquinone | Colour shade |
|---|---|---|---|
| 21 | 3-cyano-6-hydroxy-pyrid-2-one | 1-aminoanthraquinone | Yellow |

TABLE 2-continued

| Example | Pyrid-2-one | Aminoanthraquinone | Colour shade |
|---|---|---|---|
| 22 | 3-cyano-6-hydroxy-4H-pyridin-2(1H)-one | 1-amino-5-benzoylamino-anthraquinone | Orange |
| 23 | 3-cyano-6-hydroxy-4H-pyridin-2(1H)-one | 1-amino-8-benzoylamino-anthraquinone | Orange |
| 24 | 3-cyano-6-hydroxy-4H-pyridin-2(1H)-one | 1-amino-4-benzoylamino-anthraquinone | Brown |
| 25 | 3-carbamoyl-6-hydroxy-4-methyl-pyridin-2(1H)-one | 1-aminoanthraquinone | Orange |
| 26 | 3-carbamoyl-6-hydroxy-4-methyl-pyridin-2(1H)-one | 1-amino-5-benzoylamino-anthraquinone | Orange |
| 27 | 3-carbamoyl-6-hydroxy-4-methyl-pyridin-2(1H)-one | 1-amino-4-benzoylamino-anthraquinone | Brown |
| 28 | 3-chloro-6-hydroxy-4-methyl-pyridin-2(1H)-one | 1-aminoanthraquinone | Yellow |
| 29 | 3-chloro-6-hydroxy-4-methyl-pyridin-2(1H)-one | 1-amino-5-benzoylamino-anthraquinone | Orange |

TABLE 2-continued

| Example | Pyrid-2-one | Aminoanthraquinone | Colour shade |
|---|---|---|---|
| 30 | 4-methyl-3-chloro-6-hydroxy-pyrid-2-one | 1-amino-4-benzamido-anthraquinone | Brown |
| 31 | 4-hydroxy-3-carbamoyl-6-hydroxy-pyrid-2-one | 1-amino-anthraquinone | Yellow |
| 32 | 4-carboxy-6-hydroxy-pyrid-2-one | 1-amino-5-benzamido-anthraquinone | Reddish-tinged yellow |
| 33 | 4-methyl-3-(2-hydroxyquinazolinyl)-6-hydroxy-pyrid-2-one | 1-amino-4-benzamido-anthraquinone | Brown |
| 34 | 4-methyl-3-(benzothiazol-2-yl)-6-hydroxy-pyrid-2-one | 1-amino-anthraquinone | Orange |
| 35 | 4-phenyl-3-cyano-6-hydroxy-pyrid-2-one | 1-amino-anthraquinone | Yellow |
| 36 | 4-methyl-3-methylsulfonyl-6-hydroxy-pyrid-2-one | 1-amino-anthraquinone | Yellow |
| 37 | 4-methyl-3-acetyl-6-hydroxy-pyrid-2-one | 1-amino-anthraquinone | Yellow |

EXAMPLE 38

(a) 8 g of the finely divided pigment obtained according to Example 1a are ground on an automatic Hoover-Muller grinder with a stoving lacquer consisting of 25 g of coconut oil alkyd resin (40% of coconut oil), 10 g of melamine resin, 50 g of toluene and 7 g of glycol monomethyl ether. The mixture is applied to the substrate to be lacquered and the lacquer is hardened by stoving at 130° C. to give yellow lacquerings with very good fastness to over-lacquering and outstanding fastness to light and weathering.

Pigmented stoving lacquers with the same fastness properties are obtained if 15–25 g of the alkyd resin indicated or of an alkyd resin based on cottonseed oil, dehydrated castor oil, castor oil or synthetic fatty acids are used, and 10–15 g of the melamine resin mentioned or of a condensation product of formaldehyde with urea or with benzoguanamine are used instead of the amount of melamine resin indicated.

(b) If 1 to 10 g of a mixture of titanium dioxide (rutile type) with the pigment indicated in Example 38a in the ratio 0.5–50:1 are ground into the lacquer described in Example 38a instead of the amount of pigment indicated, the same further processing gives lacquerings with the same fastness properties and with a yellow colour shade which shifts towards white with increasing content of titanium dioxide.

EXAMPLE 39

6 g of finely divided pigment according to Example 1a are ground into 100 g of a nitrocellulose lacquer consisting of 44 g of collodion cotton (low-viscosity, 35% strength, butanol-moist), 5 g of dibutyl phthalate, 40 g of ethyl acetate, 20 g of toluene, 4 g of n-butanol and 10 g of glycol monomethyl ether. After brushing the lacquer onto a substrate and drying, yellow lacquerings of outstanding fastness to light and over-lacquering are obtained. The same results are obtained using nitrocellulose lacquers which have a nitrocellulose content of 10–15 g and a plasticiser content of 5–10 g and contain 70–85 g of a solvent mixture, aliphatic esters, such as ethyl acetate and butyl acetate, and aromatics, such as toluene and xylene, and relatively small proportions of aliphatic ethers, such as glycol ether, and alcohols, such as butanol, preferably being used. By plasticisers there may be understood, for example: phthalates, such as dioctyl phthalate and dibutyl phthalate, esters of phosphoric acid, and castor oil, by itself or in combination with oil-modified alkyd resins.

Lacquerings with similar fastness properties are obtained using other spirit lacquers, Zapon lacquers and nitrocellulose lacquers which dry physically, air-drying oil varnishes, synthetic resin lacquers and nitrocellulose combination lacquers, and oven-drying and air-drying epoxide resin lacquers, if appropriate in combination with urea resins, melamine resins, alkyd resins or phenolic resins.

EXAMPLE 40

5 g of finely divided pigment according to Example 1a are ground in a porcelain ball mill with 100 g of an unsaturated polyester resin which dries without paraffin. 10 g of styrene, 59 g of melamine/formaldehyde resin and 1 g of a paste consisting of 40% of cyclohexanone peroxide and 60% of dibutyl phthalate are stirred thoroughly with the ground material, and finally 4 g of a dryer solution (10% strength cobalt naphthenate in white spirit) and 1 g of silicone oil solution (1% strength in xylene) are admixed. The mixture is applied to primed wood and a high-gloss, water-resistant yellow lacquering which is fast to weathering and has outstanding fastness to light is obtained.

If amine-hardening epoxide resin lacquers with dipropylenediamine as the amine component are used instead of the reactive lacquer based on unsaturated polyester resins, yellow lacquerings of outstanding fastness to weathering and efflorescence are obtained.

EXAMPLE 41

100 g of a 65% strength solution of an aliphatic polyester, with about 8% of free hydroxyl groups, in glycol monoethyl ether-acetate are ground with 5 g of the pigment obtained according to Example 1a and the ground material is then mixed thoroughly with 44 g of a 67% strength solution of the reaction product of 1 mol of trimethylolpropane and 3 mols of toluylene diisocyanate. Without impairment of the pot life, after application of the mixture and reaction of the components, high-gloss yellow polyurethane lacquerings of outstanding fastness to efflorescence, light and weathering result.

Pigmentations of similar fastness are obtained using other two-component lacquers based on aromatic or aliphatic isocyanates and polyethers or polyesters containing hydroxyl groups, and with polyisocyanate lacquers which dry in the presence of moisture and give polyurea lacquerings.

EXAMPLE 42

5 g of a fine paste obtained by kneading 50 g of the pigment obtained according to Example 1a with 15 g of an aryl polyglycol ether emulsifier and 35 g of water are mixed with 10 g of baryte, as the filler, 10 g of titanium dioxide (rutile type) as a white pigment, and 40 g of an aqueous emulsion paint containing about 50% of polyvinyl acetate. The paint is brushed onto the substrate and, after drying, yellow paint films of very good fastness to lime and cement and outstanding fastness to weathering and light are obtained.

The fine paste obtained by kneading is likewise suitable for pigmenting clear polyvinyl acetate emulsion paints, and for emulsion paints which contain copolymers of styrene and maleic acids as binders and emulsion paints based on polyvinyl propionate, polymethacrylate or butadiene/styrene.

EXAMPLE 43

10 g of the pigment paste mentioned in Example 42 are mixed with a mixture of 5 g of chalk and 5 g of 20% strength size solution. A yellow wallpaper paint with which coatings of outstanding fastness to light are achieved is obtained. To prepare the pigment paste, it is also possible to use other non-ionic emulsifiers, such as the reaction products of nonylphenol and ethylene oxide, or ionic wetting agents, such as the sodium salts of alkylarylsulphonic acids, for example of dinaphthylmethanedisulphonic acid, sodium salts of substituted sulpho-fatty acid esters and sodium salts of paraffinsulphonic acids, in combination with alkyl polyglycol ethers.

EXAMPLE 44

A mixture of 65 g of polyvinyl chloride, 35 g of diisooctyl phthalate, 2 g of dibutyl-tin mercaptide, 0.5 g of titanium dioxide and 0.5 g of the pigment of Example 1a is compounded on a mixing mill at 165° C. An intensely yellow-coloured mass which can be used for producing films or shaped articles is obtained. The coloration is distinguished by outstanding fastness to light and very good fastness to plasticisers.

EXAMPLE 45

0.2 of the pigment according to Example 1a is mixed with 100 g of polyethylene granules, polypropylene granules or polystyrene granules. The mixture can be either injection-moulded directly in an injection-moulding machine at 220° to 280° C., or processed to coloured rods in an extruder or to coloured hides on a mixing mill. If appropriate, the rods and hides are granulated and the granules injection-moulded in an injection-moulding machine.

The yellow moulded articles have very good fastness to light and migration. Synthetic polyamides of caprolactam or adipic acid and hexamethylenediamine, or the condensation products of terephthalic acid and ethylene glycol can be coloured in a similar manner at 280°–300° C., if appropriate under a nitrogen atmosphere.

EXAMPLE 46

1 g of the pigment according to Example 1a, 10 g of titanium dioxide (rutile type) and 100 g of a pulverulent copolymer based on acrylonitrile/butadiene/styrene are mixed and the mixture is compounded on a roll mill at 140°–180° C. A yellow-coloured hide is obtained and is granulated and the granules are injection-moulded in an injection-moulding machine at 200°–250° C. Yellow moulded articles of very good fastness to light and migration and excellent stability to heat are obtained.

Plastics based on cellulose acetate, cellulose butyrate and mixtures thereof can be coloured in shades with similar fastness properties in a similar manner, but at temperatures of 180°–220° C. and without the addition of titanium dioxide.

EXAMPLE 47

0.2 g of finely divided pigment according to Example 1a is mixed with 100 g of a plastic based on polycarbonate in an extruder or in a kneading screw at 250°–280° C. and the mixture is processed to granules. Yellow, transparent granules of outstanding fastness to light and stability to heat are obtained.

EXAMPLE 48

90 g of a slightly branched polypropylene glycol with a molecular weight of 2,500 and a hydroxyl number of 56, 0.25 g of endoethylenepiperazine, 0.3 g of tin-II octoate, 1.0 g of a polyether siloxane, 3.5 g of water and 12.0 g of a paste of 10 g of the pigment according to Example 1a in 50 g of the polypropylene glycol indicated are mixed thoroughly with one another, the mixture is then mixed intimately with 45 g of toluylene diisocyanate (80% of the 2,4-isomer and 20% of the 2,6-isomer), and the final mixture is poured into a mould. After 6 seconds, the mixture becomes cloudy and foams. After 70 seconds, an intensely yellow-coloured, soft polyurethane foam has formed, the pigmentation of which has outstanding fastness to light.

EXAMPLE 49

90 g of a slightly branched polyester of adipic acid, diethylene glycol and trimethylolpropane which has a molecular weight of 2,000 and a hydroxyl number of 60 are mixed with the following components: 1.2 g of dimethylbenzylamine, 2.5 g of sodium castor oil-sulphate, 2.0 g of an oxyethylated, benzylated hydroxydiphenyl, 1.75 g of water and 12 g of a paste prepared by grinding 10 g of the pigment according to Example 1a in 50 g of the abovementioned polyester. After the mixing, 40 g of toluylene diisocyanate (65% of the 2,4-isomer and 35% of the 2,6-isomer) are stirred in and the mixture is poured into a mould and foamed. After 60 seconds, a yellow-coloured, soft polyurethane foam has formed, the coloration of which is distinguished by very good fastness to light.

EXAMPLE 50

Deep yellow offset prints of high brilliancy and very good fastness to light and lacquering are obtained with a printing paste prepared by grinding 35 g of the pigment according to Example 1a with 65 g of linseed oil and adding 1 g of siccative (Co naphthenate, 50% strength in white spirit). Using this printing paste in letterpress printing, collotype printing, lithographic printing or die stamping leads to yellow prints with similar fastness properties. If the pigment is used for colouring tinplate printing pastes or low-viscosity gravure printing pastes or printing inks, yellow prints with similar fastness properties are obtained.

EXAMPLE 51

A printing paste is prepared from 10 g of the fine pigment paste indicated in Example 42, 100 g of 3% strength tragacanth gum, 100 g of an aqueous 50% strength egg albumin solution and 25 g of a non-ionic wetting agent. A textile fibre fabric is printed with this paste and steamed at 100° C. and a yellow print which is distinguished by excellent fastness properties, in particular fastness to light, is obtained. Other binders which can be used for fixing the pigment onto the fibre, for example binders based on synthetic resin, or British gum or cellulose glycolate, can be used in the printing formulation instead of the tragacanth gum and egg albumin.

EXAMPLE 52

A mixture of 100 g of light crepe, 2.6 g of sulphur, 1 g of stearic acid, 1 g of mercaptobenzthiazole, 0.2 g of hexamethylenetetramine, 5 g of zinc oxide, 60 g of chalk and 2 g of titanium dioxide (anatase type) is compounded on a mixing mill at 50° C. and coloured with 2 g of the pigment obtained according to Example 1a, and the final mixture is then vulcanised at 140° C. for 12 minutes. A yellow-coloured vulcanisation product of very good fastness to light is obtained.

EXAMPLE 53

22.5 l of an aqueous, approximately 9% strength viscose solution are added, in a stirred apparatus, to 100 g of a 20% strength aqueous paste of the pigment according to Example 1a, which has been prepared, for example, by dissolving the pigment in 96% strength sulphuric acid, discharging the solution onto ice, filtering the mixture and washing the material on the filter with water until neutral. The coloured composition is stirred for 15 minutes and then deaerated and subjected to a spinning and desulphurising process. Yellow filaments or films with very good fastness to light are obtained.

EXAMPLE 54

10 kg of paper pulp containing 4 g of cellulose per 100 g are treated in a hollander for about 2 hours. During this period, 4 g of resin size, then 30 g of an approximately 15% strength pigment dispersion obtained by grinding 4.8 g of the pigment obtained according to Example 1a with 4.8 g of dinaphthylmethanedisulphonic acid and 22 g of water in a ball mill, and then 5 g of aluminium sulphate are added, in each case at intervals of a quarter of an hour.

After finishing on a paper-making machine, yellow-coloured paper of outstanding fastness to light is obtained.

EXAMPLE 55

The yellow-pigmented paper produced according to Example 54 is impregnated with a 55% strength solution of a urea/formaldehyde resin in n-butanol and baked at 140° C. Yellow laminated paper of very good fastness to migration and outstanding fastness to light is obtained.

Laminated paper with the same fastness properties is obtained by laminating paper which has been printed, by the gravure printing process, with a printing paste containing the fine yellow pigment paste described in Example 42 and water-soluble or saponifiable binders.

EXAMPLE 56

20 g of the pigment obtained according to Example 1a are finely dispersed in 50 g of dimethylformamide in a bead mill, using a dispersing auxiliary consisting of 50 g of a 10% strength solution of polyacrylonitrile in dimethylformamide. The pigment concentrate thus obtained is added to a spinning solution of polyacrylonitrile in a known manner and the spinning solution is homogenised and then spun to filaments by known dry spinning processes or wet spinning processes.

Yellow-coloured filaments, the colorations of which are distinguished by very good fastness to rubbing, washing, migration, heat, light and weathering, are obtained.

We claim:

1. Anthraquinone-azo compound of the formula

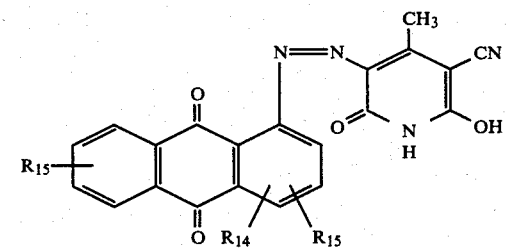

wherein
$R_{13}$ denotes hydrogen, hydroxyl, or benzoylamino which is unsubstituted or substituted by chlorine or nitro,
$R_{14}$ denotes hydrogen or methyl and
$R_{15}$ denotes hydrogen, chlorine, or benzoylamino which is unsubstituted or substituted by chlorine or nitro.

2. The anthraquinone-azo compound of the formula

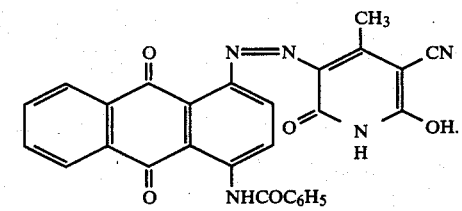

3. The anthraquinone-azo compound of the formula

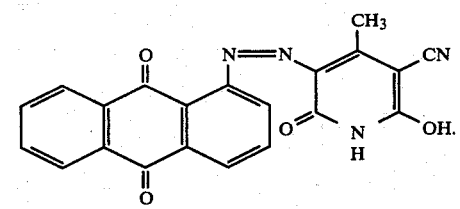

4. The anthraquinone-azo compound of the formula

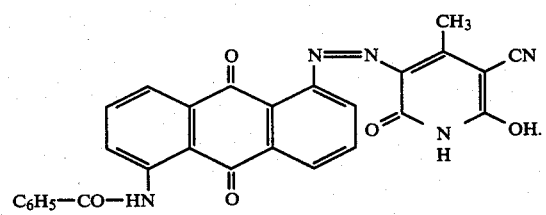

* * * * *

UNITED STATES PATENT AND TRADEMARK OFFICE
CERTIFICATE OF CORRECTION

PATENT NO. : 4,709,019

DATED : November 24, 1987

INVENTOR(S) : Meinhard Rolf, et al.

It is certified that error appears in the above-identified patent and that said Letters Patent is hereby corrected as shown below:

| | |
|---|---|
| Title Page, under "Foreign Patent Documents", line 4 | Delete "1973" and substitute --1974-- |
| Title Page, "Abstract", line 2 | After "which" insert --,-- |
| Col. 3, line 46 | After "amino-8" insert -- - -- |
| Col. 4, line 21 | Before ")-carbonyl" delete "alkoxy" and substitute --alkyl-- |
| Col. 5, line 31 | Delete "$C_1 14 \ C_4$" and substitute --$C_1-C_4$-- |
| Col. 9, line 35 | Delete "5-hydroxy" and substitute -- 6-hydroxy-- |
| Col. 14, line 4, under "Color shade" | Delete "Orange" and substitute --Yellow-- |
| Col. 22, line 15 | Middle of formula delete "$\diagup_{R_{15}}$" and substitute --$\diagup_{R_{13}}$-- |

Signed and Sealed this

Twenty-sixth Day of July, 1988

*Attest:*

DONALD J. QUIGG

*Attesting Officer*     *Commissioner of Patents and Trademarks*